United States Patent
Park et al.

(10) Patent No.: US 11,042,502 B2
(45) Date of Patent: Jun. 22, 2021

(54) VECTOR PROCESSING CORE SHARED BY A PLURALITY OF SCALAR PROCESSING CORES FOR SCHEDULING AND EXECUTING VECTOR INSTRUCTIONS

(71) Applicants: SAMSUNG ELECTRONICS CO., LTD., Suwon-si (KR); KWANGWOON UNIVERSITY INDUSTRY-ACADEMIC COLLABORATION FOUNDATION, Seoul (KR)

(72) Inventors: Young-hwan Park, Yongin-si (KR); Hyunseok Lee, Seoul (KR); Yonggeun Hong, Seoul (KR); Suk-jin Kim, Seoul (KR)

(73) Assignees: SAMSUNG ELECTRONICS CO., LTD., Suwon-si (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 555 days.

(21) Appl. No.: 14/757,586

(22) Filed: Dec. 24, 2015

(65) Prior Publication Data
US 2016/0188531 A1    Jun. 30, 2016

(30) Foreign Application Priority Data
Dec. 24, 2014   (KR) ......................... 10-2014-0188635

(51) Int. Cl.
*G06F 9/30*    (2018.01)
*G06F 9/38*    (2018.01)
*G06F 15/80*   (2006.01)

(52) U.S. Cl.
CPC ........ *G06F 15/8053* (2013.01); *G06F 9/3012* (2013.01); *G06F 9/30036* (2013.01); *G06F 9/30109* (2013.01); *G06F 9/3877* (2013.01)

(58) Field of Classification Search
CPC .. G06F 9/3012; G06F 9/30109; G06F 9/3877; G06F 9/3881; G06F 9/3887
See application file for complete search history.

(56) References Cited

U.S. PATENT DOCUMENTS

| | | | | |
|---|---|---|---|---|
| 4,897,779 A | * | 1/1990 | Dickson | .............. G06F 13/4213 709/237 |
| 6,732,253 B1 | | 5/2004 | Redford | |

(Continued)

FOREIGN PATENT DOCUMENTS

| | | |
|---|---|---|
| JP | 3813624 B2 | 8/2006 |
| KR | 1020120134549 A | 12/2012 |

OTHER PUBLICATIONS

Goossens, B. "A multithreaded vector co-processor" Parallel Computing Technologies. 4th International Conference, PaCT-97. Proceedings: pp. 311-321, 1997.*

(Continued)

*Primary Examiner* — Jacob Petranek
(74) *Attorney, Agent, or Firm* — Sughrue Mion, PLLC

(57) ABSTRACT

An operation processing apparatus is provided. The operation processing apparatus includes a vector operator and cores. The vector operator processes a vector operation with respect to an instruction that uses the vector operation, and each core includes a scalar operator that processes a scalar operation with respect to an instruction that does not use the vector operation. The vector operator is shared by the cores.

11 Claims, 7 Drawing Sheets

(56) References Cited

U.S. PATENT DOCUMENTS

| | | | |
|---|---|---|---|
| 7,523,295 B2 | 4/2009 | Codrescu et al. | |
| 7,814,487 B2 | 10/2010 | Codrescu et al. | |
| 7,836,276 B2 | 11/2010 | Coon et al. | |
| 8,762,688 B2 | 6/2014 | Hokenek et al. | |
| 8,769,390 B2 | 7/2014 | Yang et al. | |
| 9,703,708 B2 * | 7/2017 | Alameldeen | G06F 12/0811 |
| 2005/0251649 A1 | 11/2005 | Yamazaki | |
| 2007/0074004 A1 * | 3/2007 | Wong | G06F 9/30003 712/34 |
| 2007/0074005 A1 | 3/2007 | Abernathy et al. | |
| 2011/0249744 A1 * | 10/2011 | Bailey | G06F 9/3891 375/240.16 |
| 2013/0024652 A1 * | 1/2013 | Bailey | H04N 19/127 712/3 |
| 2014/0006748 A1 * | 1/2014 | Stewart | G06F 15/7867 712/3 |
| 2015/0019836 A1 * | 1/2015 | Anderson | G06F 9/30036 712/3 |

OTHER PUBLICATIONS

Mostafa I. Solimana, Abdulmajid F. Al-Junaid. "A shared matrix unit for a chip multi-core processor" Journal of Parallel and Distributed Computing, vol. 73, Issue 8, Aug. 2013, pp. 1146-1156.*

Changkyu Kim, Simha Sethumadhavan, M. S. Govindan, Nitya Ranganathan, Divya Gulati, Doug Burger, Stephen W. Keckler. "Composable Lightweight Processors" MICRO 40 Proceedings of the 40th Annual IEEE/ACM International Symposium on Microarchitecture pp. 381-394, Dec. 1-5, 2007.*

Communication dated Oct. 22, 2020 issued by the Korean Intellectual Property Office in Korean Application No. 10-2014-0188635.

* cited by examiner

VECTOR PROCESSING CORE SHARED BY A PLURALITY OF SCALAR PROCESSING CORES FOR SCHEDULING AND EXECUTING VECTOR INSTRUCTIONS

CROSS-REFERENCE TO RELATED APPLICATION

This application claims priority from Korean Patent Application No. 10-2014-0188635, filed on Dec. 24, 2014 in the Korean Intellectual Property Office, the disclosure of which is incorporated by reference herein in its entirety.

BACKGROUND

1. Field

Apparatuses and methods consistent with exemplary embodiments relate to effectively performing operation processing in a processor and, more particularly, to processors in which a plurality of cores share a vector operator.

2. Description of the Related Art

Early stage processors employed scalar processing that adopted a Single Instruction Single Data (SISD) execution model in which just single data is operated for a single instruction. More recently, with the increasing amount of data to be processed in smartphones and high-definition televisions, vector processors that employ a Single Instruction Multiple Data (SIMD) execution model have become more common, in which multiple data is operated on by a single instruction. The vector processors allow repetitive operations at high speed with respect to multiple data configuring a vector In the case that both scalar processing and vector processing is used, there is a disadvantage in that the vector processing is often delayed until the scalar operation is completed. Moreover, there is a disadvantage in that a processor that provides vector processing occupies a large space on a semiconductor chip surface due to the amount of circuits necessary for supporting the multiple operations, but such a processor is inefficient in that there exist idle states in which the processor waits without any transport of control or information.

SUMMARY

One or more exemplary embodiments provide a processor that performs vector operations but reduces idle states of the processor, and it is another aspect to effectively decrease a surface area of a semiconductor chip implementing the processor.

According to an aspect of an exemplary embodiment, there is provided an operation processing apparatus including a vector operator configured to process a vector operation with respect to an instruction that uses the vector operation; and a plurality of cores, each comprising a scalar operator configured to process a scalar operation with respect to an instruction that does not use the vector operation, wherein the vector operator is shared by the plurality of cores.

The vector operator may comprise a plurality of pipelining stages, and the vector operator may be configured to process instructions transferred from the plurality of cores sequentially in accordance with the pipelining stages.

The operation processing apparatus may further comprise a vector register configured to store data used by the vector operation, wherein the vector register is shared by the plurality of cores.

Each of the plurality of cores may comprise a vector register configured to store data used by the vector operation.

The operation processing apparatus may further comprise a scheduler configured to select one or more cores from among the plurality of cores and deliver an instruction to be processed by the selected one or more cores to the vector operator.

The scheduler may be further configured to determine processing priorities of instructions to be processed by the vector operator, and to deliver the instructions to the vector operator based on the determined processing priorities.

Each of the plurality of cores may comprise a vector register configured to store data used by the vector operation, and the operation processing apparatus may further comprise a register merger configured to merge a vector register in the selected one or more cores with a vector register in one or more unselected cores.

The register merger may reduce a bit length of high-order bits that specify one of the plurality of cores in an operand input to the selected one or more cores, in which remaining bits represent a relative address in a merged vector register.

According to another aspect of an exemplary embodiment, there is provided an operation processing method performed by a processor comprising a plurality of cores, the method comprising receiving an instruction in each of the plurality of cores; when the received instruction uses a vector operation, transferring the received instruction to a vector operator of the processor and processing the vector operation with respect to the received instruction; and when the received instruction does not use the vector operation, transferring the received instruction to a scalar operator of the processor and processing a scalar operation with respect to the received instruction, wherein the vector operator is shared by the plurality of cores and the scalar operator is independently included in each of the plurality of cores.

In the processing of the vector operation, the instructions may be transferred from the plurality of cores are processed sequentially in accordance with pipelining stages.

The processing of the vector operation may comprise reading data used by the vector operation from a vector register shared by the plurality of cores.

The processing of the vector operation may comprise reading data used by the vector operation from a vector register included independently in each of the plurality of cores.

The method may further comprise selecting one or more cores among the plurality of cores to transfer an instruction to be processed by the selected one or more cores to the vector operator.

The method may further comprise determining processing priorities of instructions being executed by the vector operator.

The processing of the vector operation may comprise reading data used by the vector operation from a vector register included independently in each of the plurality of cores, wherein the method may further comprise merging a vector register in the selected one or more cores with a vector register in one or more unselected cores.

The merging may comprise reducing a bit length of high-order bits that specify one of the plurality of cores in an operand input to the selected one or more cores, in which remaining bits represent a relative address in a merged vector register.

According to another aspect of an exemplary embodiment, there is provided a non-transitory computer-readable storage medium having stored therein program instructions which, when executed by a computer, perform the method comprising receiving an instruction in each of the plurality of cores; when the received instruction uses a vector operation, transferring the received instruction to a vector operator of the processor and processing the vector operation with respect to the received instruction; and when the received instruction does not use the vector operation, transferring the received instruction to a scalar operator of the processor and processing a scalar operation with respect to the received instruction, wherein the vector operator is shared by the plurality of cores.

According to another aspect of an exemplary embodiment, there is provided an operation processing apparatus comprising a plurality of scalar cores, each scalar core comprising a scalar operator configured to process a scalar operation; a vector core that is shared by the plurality of scalar cores and is configured to process a vector operation; and a scheduler that is configured to select one or more scalar cores from among the plurality of scalar cores and deliver an instruction that uses vector processing from the selected one or more scalar cores to the vector core for processing.

The vector core may comprise a plurality of pipelining stages, and the scheduler may transfer the instruction from the selected one or more scaler cores to the pipelining stages.

Each of the scalar cores may comprise a vector register configured to store data used by the vector operation, and wherein the operation processing apparatus may further comprise a register merger configured to merge a vector register in the selected one or more scalar cores with a vector register in one or more unselected scalar cores.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
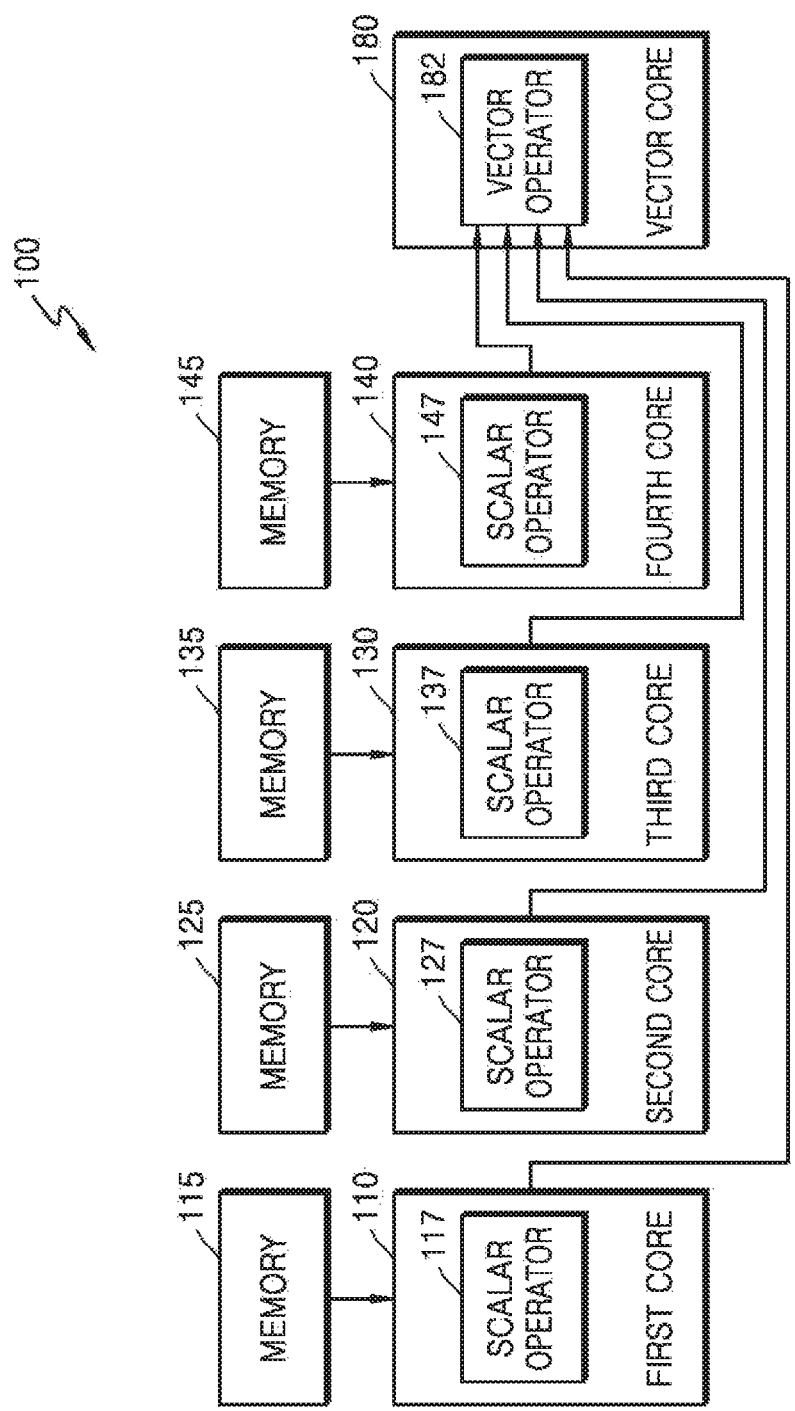
FIG. 1 is a block diagram of an operation processing apparatus according to an exemplary embodiment.

Additional aspects will be set forth in part in the description which follows and, in part, will be apparent from the description, or may be learned by practice of the presented exemplary embodiments A vector processor may include a plurality of cores, and each of the cores may include a vector operator capable of executing multiple operations at once and a scalar operator sequentially performing the operations.

In the case that the vector operator is affected by an operation result of the scalar operator, however; the operation of the vector operator may be delayed until the scalar operation of the scalar operator is completed. Furthermore, when a result of a preceding operation is used in a following operation in the vector operator, the following operation has a dependency on the result of the preceding operation and cannot be performed until the result of the preceding operation is written into a register.

Therefore, as described above, the processor that implements vector operations occupies a large space on a semiconductor chip surface due to the amount of circuits necessary for supporting the multiple operations, but such a processor is inefficient in that there exist idle states in which the processor waits without any transport of control or information.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present inventive concept.

FIG. 1 illustrates an operation processing apparatus 100 according to an exemplary embodiment. The operation processing apparatus 100 may include a first core 110, a second core 120, a third core 130, a fourth core 140, memories 115-145, and a vector core 180. As shown in FIG. 1, the first core 110 is provided with a corresponding memory 115, the second core 120 is provided with a corresponding memory 125, the third core 130 is provided with a corresponding memory 135 and the fourth core 140 is provided with a corresponding memory 145. The operation processing apparatus 100 described below may be a processor, and may include a central processor designed based on von Newman architecture or Harvard architecture. Furthermore, the central processor in the operation processing apparatus 100 may have architecture of ARM, MIPS (Microprocessor without interlocked pipeline stage), PowerPC, X86, AVR, Coldfile/38k, or 8051 families. However, the architecture of the operation processing apparatus 100 is not limited to such families.

The memories 115-145 represent a whole or partial space of a memory device which constitutes a storage of a specific machine. The memories 115-145 may store input data and instructions for the operations performed by a respective one of the cores 110, 120, 130, and 140, and operation results of the instructions. For example, the memory 115 may store instructions and input data for operations performed by the first core 110, and operation results processed by the first core 110. Similarly, the memory 125 may store instructions and input data for operations performed by the second core 120, and operation results processed by the second core 120, and so on and so forth.

The first core 110 through the fourth core 140 may execute instructions respectively received from the memories 115, 125, 135, and 145. Each core 110, 120, 130, or 140 is in charge of a thread associated with it.

The first core 110 through the fourth core 140 may include scalar operators 117, 127, 137, and 147, respectively. The scalar operators 117, 127, 137, and 147 may execute operations that are inadequate for parallel processing.

The vector core 180 may execute multiple data in response to a single instruction. The vector core 180 may include a vector operator 182 for processing a vector operation. The vector operator 182 may be represented by a Single-Instruction Multiple-Data (SIMD) operator. In the below description, it should be understood that the meaning of the expression of "to transfer an instruction to the vector core 180" includes transferring of the instruction to the vector core 180 and processing of the instruction by use of the vector operator 182.

Although not shown in FIG. 1, the operation processing apparatus 100 may further include an instruction storage and a controller. The instruction storage (not shown) may store commands for various controls carried out in the operation processing apparatus 100. The controller (not shown) may generate control signals used for controlling scalar operations and vector operations.

Although FIG. 1 shows that the operation processing apparatus 100 includes four cores, i.e., the first core 110 through the fourth core 140, along with a single vector core 180, the number of cores and vector cores are not limited to those numbers. The operation processing apparatus 100 may include N cores, where N denotes a positive integer greater than 1, and vector cores of a number less than N.

For example, the operation processing apparatus 100 may include four cores and two vector cores, and every two of the four cores may share one of the two vector cores. Alternatively, the operation processing apparatus 100 may include eight cores and one vector core, so that the eight cores share the single vector core.

Each core of the operation processing apparatus 100 may perform an operation different from that of the other cores. For example, the first core 110 may process operations for image rendering while the second core 120, the third core 130, and the fourth core 140 may process operations for video encoding, audio signal processing, and user interface processing, respectively. During the image rendering operations performed by the first core 110, the scalar operations may be carried out by the scalar operator 117 while the vector operations may be accomplished by the vector operator 182 being shared by the plurality of cores 110, 120, 130, and 140.

The method of sharing the vector operator 182 by the first core 110 through the fourth core 140 will now be described below.

Figure 2:
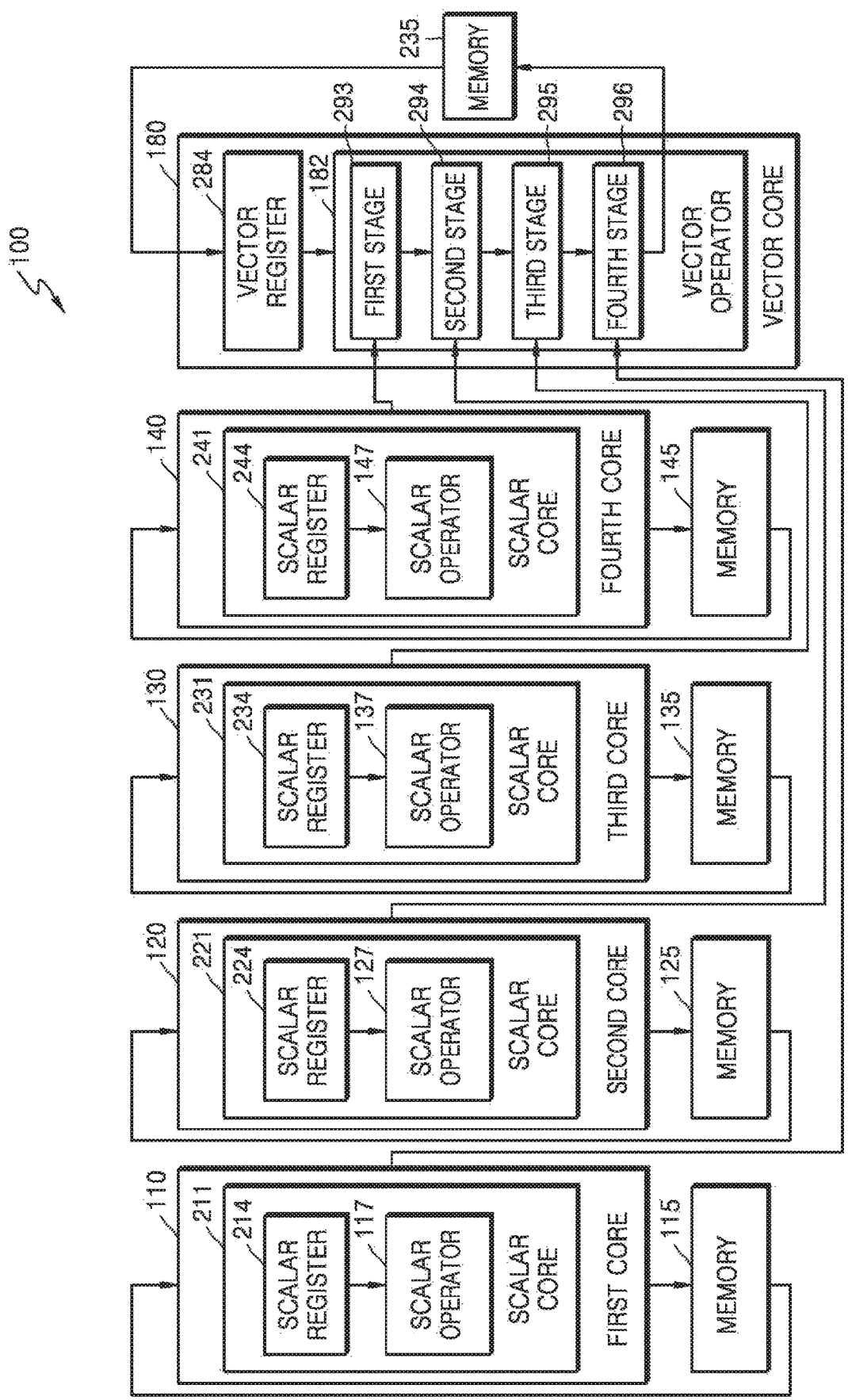
FIG. 2 is a detailed block diagram of the operation processing apparatus of FIG. 1.

FIG. 2 illustrates in detail the operation processing apparatus 100 according to an exemplary embodiment.

The operation processing apparatus 100 according to the present exemplary embodiment may include the first core 110, the second core 120, the third core 130, the fourth core 140, and the vector core 180. Although it is shown in FIG. 2, for convenience of description, that the operation processing apparatus 100 includes four cores and a single vector core, the number of cores and vector cores are not limited to those numbers. As described above, the operation processing apparatus 100 may include N cores, where N denotes a positive integer greater than 1, and vector cores of a number less than N.

The memories 115, 125, 135, and 145, the scalar operators 117, 127, 137, and 147, and the vector operator 182 are similar to those in FIG. 1, and detailed descriptions of the memories 115, 125, 135, and 145, the scalar operators 117, 127, 137, and 147, and the vector operator 182 will not be repeated.

Each of the plurality of cores 110, 120, 130, and 140 may include a scalar core 211, 221, 231, and 241, respectively. The scalar core 211 may include the scalar operator 117 and a scalar register 214. The scalar core 221 may include the scalar operator 127 and a scalar register 224. The scalar core 231 may include the scalar operator 137 and a scalar register 234. The scalar core 241 may include the scalar operator 147 and a scalar register 244. The scalar registers 214, 224, 234, and 244 may store data and instructions for operations performed by the scalar operators 117, 127, 137, and 147, respectively.

A memory 235 may store input data for the operations performed by the vector core 180 and operation result data after the vector operations are performed on the input data.

The vector core 180 may include a vector register 284 that may store data which the vector operator 182 uses for the operations. The vector register 284 may store memory addresses for accessing vector operation elements, and is a register that is readable from and writable to in response to a vector command.

As described above, the plurality of cores, i.e., the first through fourth cores 110-140 share the vector operator 182. Thus, each of the first through fourth cores 110-140 may transfer the instruction using the vector operation to the vector core 180, so that the vector core 180 processes the vector operation defined by the instruction. The first through fourth cores 110-140 according to an exemplary embodiment decode input instructions, and may transfer the instructions that are determined to use the vector operation to the vector core 180.

The first through fourth cores 110-140 may use the vector operator 182 sequentially in accordance with pipelining stages of the vector operator 182. For example, the first core 110 may use the vector operator 182 in a first clock cycle. The second core 120 may use the vector operator 182 in a next clock cycle. Similarly, the third and the fourth core 130 and 140 may use the vector operator 182 in subsequent clock cycles. Afterwards, the first core 110 may use the vector operator 182 again. As a result, the first core may reuse the vector operator 182 after four clock cycles. It is noted that this is only an example, and the order in which the first through fourth cores 110-140 use the vector operator 182 may vary. For example, the second core 120 may use the vector operator 182 in a first clock cycle and the first core 110 may use the vector operator 182 in a second clock cycle.

The vector operator 182 according to an exemplary embodiment may divide a vector operation process into first through fourth stages 293-296, and pipeline the vector operation in accordance with the stages 293-296. It should be noted that the first through fourth stages 293-296 may also be referred to as pipelining stages. The instructions transferred from the first core 110 through the fourth core 140 are referred to in the example below as first through fourth instructions, respectively, for convenience of description.

In the first clock cycle, the vector operator 182 may perform the first stage 293 for the first instruction.

In the next clock cycle, the vector operator 182 may perform the second stage 294 for the first instruction along with the first stage 293 for the second instruction.

In the subsequent clock cycle, the vector operator 182 may perform the third stage 295 for the first instruction, the second stage 294 for the second instruction, and the first stage 293 for the third instruction.

In the following clock cycle, the vector operator 182 may perform the fourth stage 296 for the first instruction, the third stage 295 for the second instruction, the second stage 294 for the third instruction, and the first stage 293 for the fourth instruction.

In another clock cycle, the vector operator 182 may perform the first stage 293 for the first instruction again along with the fourth stage 296 for the second instruction, the third stage 295 for the third instruction, and the second stage 294 for the fourth instruction.

Although it is assumed in the above example that the processor has four pipelining stages, it should be noted that the number of pipelining stages may be modified depending on the architecture of the processor.

The first through fourth cores 110-140 may share a vector register 284 in an exemplary embodiment. Accordingly, in such an exemplary embodiment, data used for the execution of each instruction is read from the vector register 284, and the vector register 284 may be overwritten whenever a new instruction is input.

For example, assuming that the first stage 293 is being performed for the first instruction in a current clock cycle, the first instruction proceeds to the second stage 294 in the next clock cycle and the second instruction is newly input to the vector operator 182 for the first stage 293. At this moment, the data stored in the vector register 284 may be overwritten by the data used for the execution of the second instruction.

Figure 3:
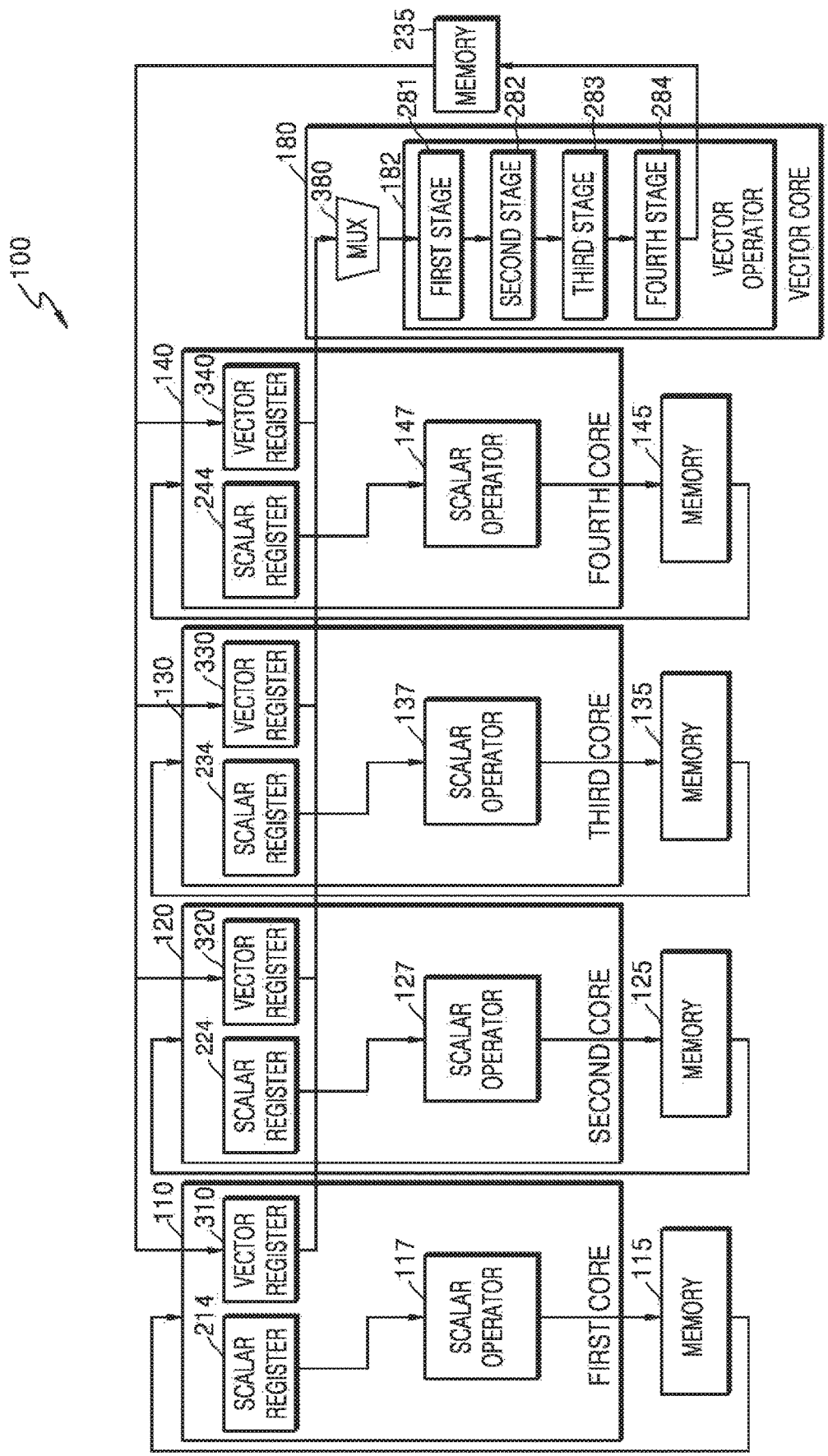
FIG. 3 is a block diagram of an operation processing apparatus according to another exemplary embodiment.

FIG. 3 illustrates the operation processing apparatus 100 according to another exemplary embodiment.

The operation processing apparatus 100 according to the present embodiment may include the first core 110, the second core 120, the third core 130, the fourth core 140, and the vector core 180. The operation processing apparatus 100 of FIG. 3 differs from that shown in FIG. 2 in that the first through fourth cores 110-140 separately include independent vector registers 310, 320, 330, and 340, respectively. That is, rather than providing the vector register 284 in common in the vector core 180, each of the first through fourth cores 110-140 includes a vector register 310, 320, 330, 340, respectively.

Since the data used for the execution of the instructions are stored in the independent vector registers in this exemplary embodiment, the data in the vector register is overwritten even when the first through fourth instructions are sequentially executed according to the pipelining stages in the vector operator 182. According to this configuration, the stability of data stored in the vector registers 310, 320, 330, and 340 is enhanced since access to each of the vector registers 310, 320, 330, and 340 is prohibited for cores other than the respective core associated with the vector register.

The vector core 180 according to an exemplary embodiment may include a multiplexer (MUX) 380 for selecting one vector register among the plurality of vector registers 310, 320, 330, and 340.

Figure 4:
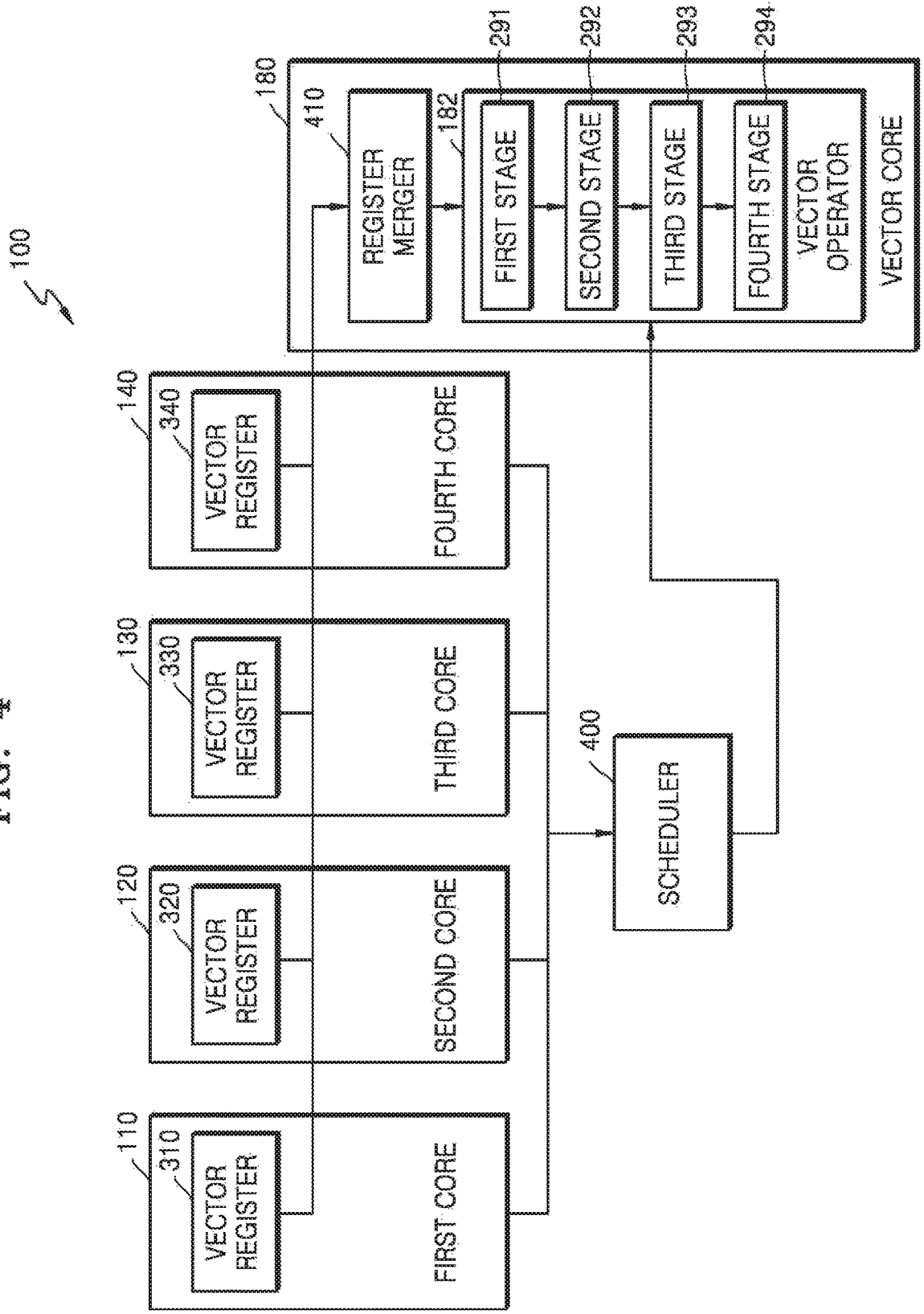
FIG. 4 is a detailed block diagram of an operation processing apparatus according to another exemplary embodiment.

FIG. 4 illustrates an operation processing apparatus 100 according to another exemplary embodiment. In the description below, since the configuration and operational features of the operation processing apparatus 100 described above with reference to FIG. 3 apply to the apparatus 100 shown in FIG. 4 as well, some of the descriptions thereof are omitted unless being described differently.

In the present exemplary embodiment, a scheduler 400 may be provided and may schedule instructions being transferred to the vector core 180. Since not all the cores have the instruction that uses execution by the vector operator 182, the scheduler 400 may select some of the first through fourth cores 110-140 and deliver the instructions of the selected cores to the vector core 180. In the case that there exist four cores for example, the scheduler 400 may select some of the four instructions each of which is being handled by the four cores, and deliver the instructions of the selected cores to the vector core 180. The scheduler 400 may also determine processing priorities of instructions to be executed by the vector operator, and deliver the instructions to the vector core 180 based on the determined processing priorities.

For example, if we assume that the second core 120 and the fourth core 140 are performing tasks that do not use a vector operation, the scheduler 400 may select only the first core 110 and the third core 130, and deliver the first and the third instructions to the vector core 180. In such a case, the second and the fourth instructions are not executed by the vector operator 182, and the vector registers 320 and 340 are not utilized.

The scheduler 400 may change the order that the instructions are executed in the vector operator 182. For example, the scheduler 400 may change the order of the instructions being transferred to the vector core 180 so that the instructions are executed in the order of, for example, the first, the third, the second, the fourth, and the first instructions rather than being executed in the order of the first, the second, the third, the fourth, and the first instructions.

The vector core 180 may include a register merger 410 that may merge one or more vector registers. The method of merging vector registers in the register merger 410 is described below with reference to FIG. 5.

Figure 5:
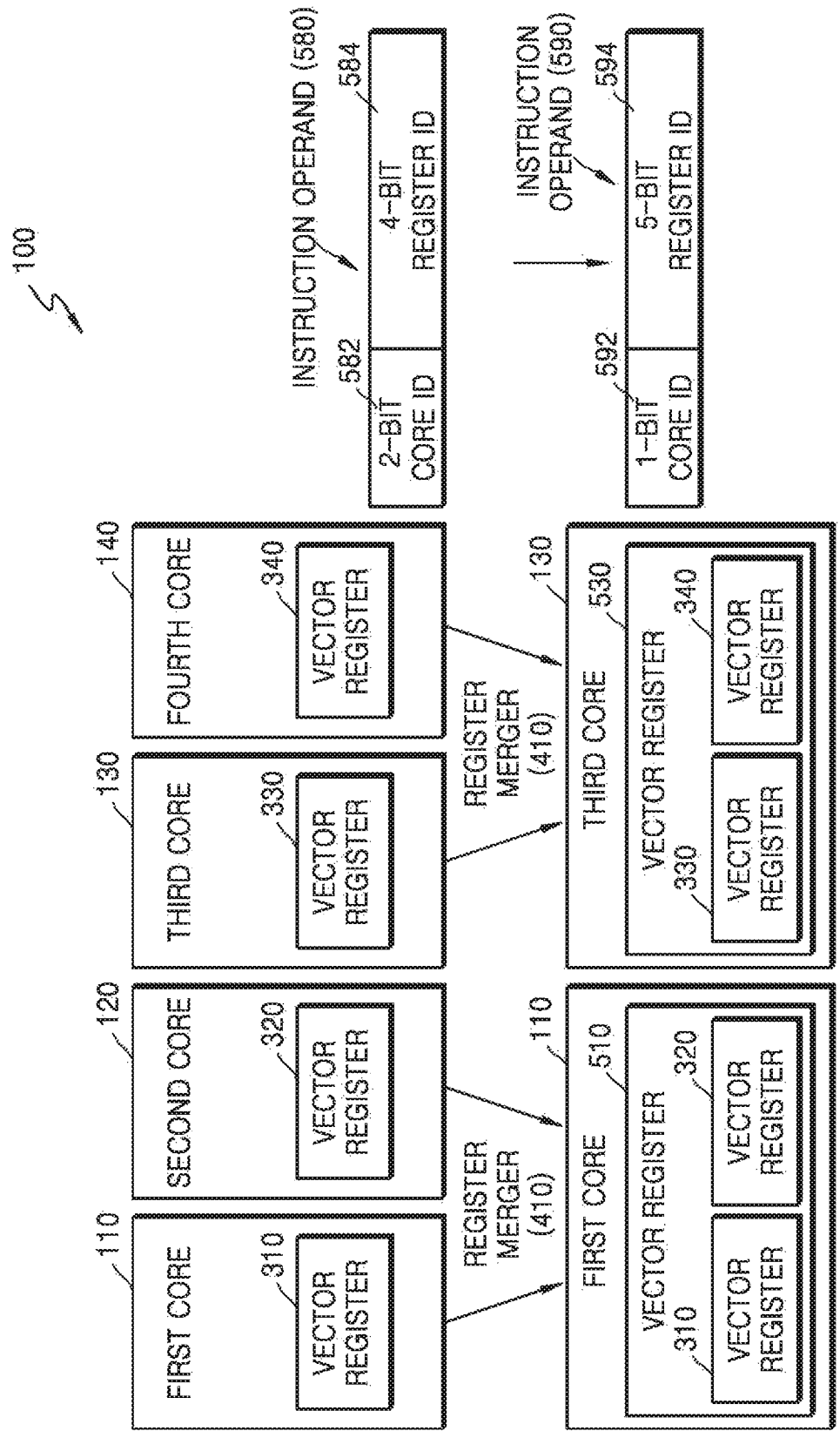
FIG. 5 illustrates merging of vector registers, performed by a register merger, according to an exemplary embodiment.

FIG. 5 illustrates the merging of the vector registers, performed by the register merger 410. It should be noted that the scheduler 400 and the vector core 180 are not shown in FIG. 5 for clarity of description.

The register merger 410 may merge the vector register of the core selected by the scheduler 400 with the vector registers in one or more unselected cores. As described above with reference to FIG. 4, the scheduler 400 may select one or more of the cores so that only the instructions of the selected cores are executed by the vector operator 182. Therefore, for example, when the scheduler 400 selects the first core 110 and the third core 130, the second and the fourth instructions are not executed by the vector operator 182, and the vector registers 320 and 340 in the second and the fourth cores 120 and 140, respectively, are not utilized.

The register merger 410 may merge the vector register in the core selected by the scheduler 400 with the vector register in the unselected core, and process the merged vector registers as a single vector register. For example, as shown in the example of FIG. 5, the register merger 410 may merge the vector register 310 in the first core 110 with the vector register 320 in the second core 120 to process the merged vector registers as a single vector register 510. As a result, the first core 110 may utilize its own vector register 310 as well as the vector register 320 in the second core 120, and thus the number or size of an accessible register is enlarged.

It is assumed, for example, that each of the vector registers 310, 320, 330, and 340 has 16 entries. If the instruction operand 580 of an instruction has a bit length of six bits and the scheduler 400 delivers all the first through fourth instructions to the vector core 180, two high-order bits 582 of the instruction operand 580 may be used as a core identifier (ID) for specifying one of the four cores 110, 120, 130, and 140 while four low-order bits 584 of the instruction operand 580 may be used for defining a relative address (e.g., a register ID) in the vector register 310, 320, 330, or 340.

If, for example, the scheduler 400 selects the first core 110 and the third core 130 among the four cores 110, 120, 130, and 140, and delivers only the first and third instructions to the vector core 180, the first core 110 may use the vector register 320 in the second core 120 (i.e., an unselected core) along with the vector register 310, and the third core 130 may use the vector register 340 in the fourth core 140 (i.e., an unselected core) with the vector register 330. As a result, the vector register 510 that the first core 110 may access and the vector register 530 that the third core 130 may access would have 32 entries, which is two times more than the number of entries before the merging.

The register merger 410 may thus effectively multiply the size of the vector register shared by the cores without physically merging the plurality of registers by changing bit allocations of the operand of the instruction.

For example, the register merger 410 may change the bit allocations of the operand so that a single highest-order bit 592 of the operand 590 specifies one of the first and third cores 110 and 130 and five remaining bits 594 define the relative address in a merged vector register 510 or 530. In other words, the register merger 410 may change the length of the leading bits in the operand of the instruction that represent one of the first and third cores 110 and 130, and the length of the trailing bits in the operand that indicate the relative address in the merged vector register 510 or 530.

Although it is shown in FIG. 5 that the vector registers 310 and 320 are merged to be used by the first core 110, the merging of the vector registers is not limited thereto. For example, the scheduler 310 may select only the first core 110 among the four cores 110, 120, 130, and 140, and the core 110 may, in such a case, use all the vector registers 310, 320, 330, and 340. In such a case, the merged register would have 64 entries, and the register merger 410 may make all the bits of the operand of the instruction indicate the relative address in the merged vector register.

Figure 6:
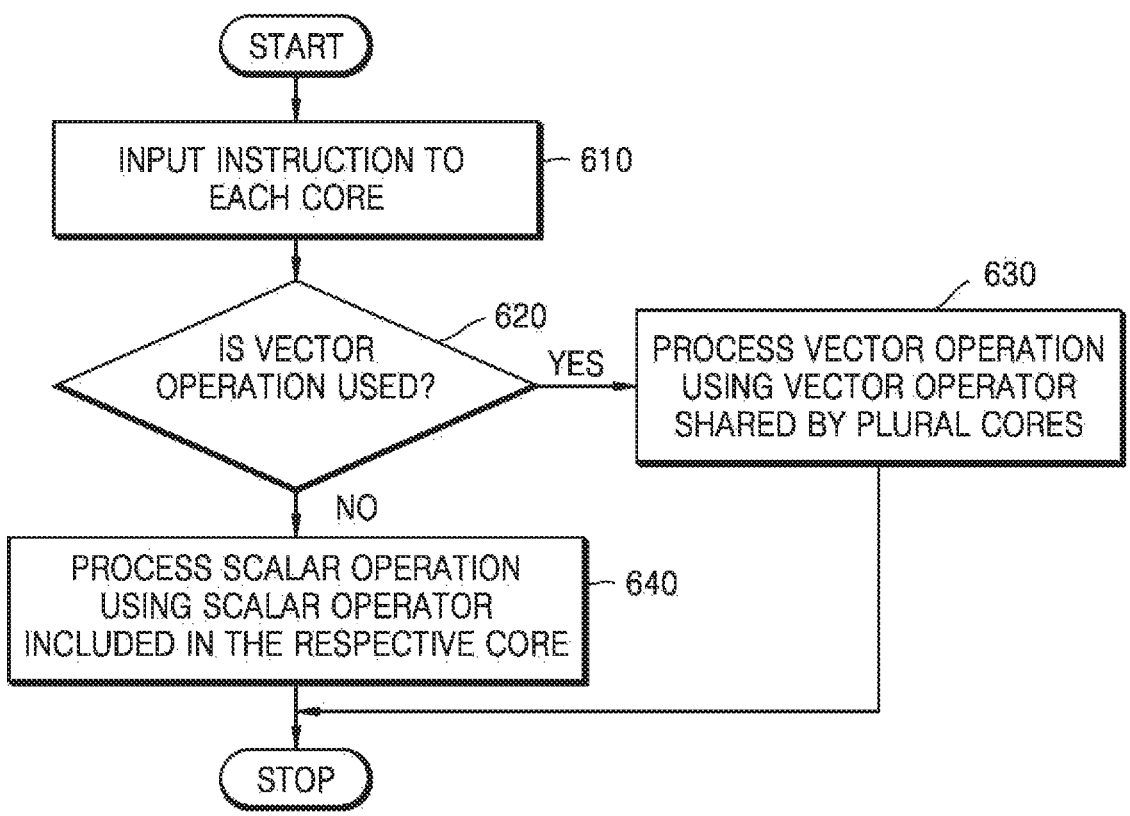
FIG. 6 is a flowchart illustrating an operation processing method according to an exemplary embodiment.
Figure 7:
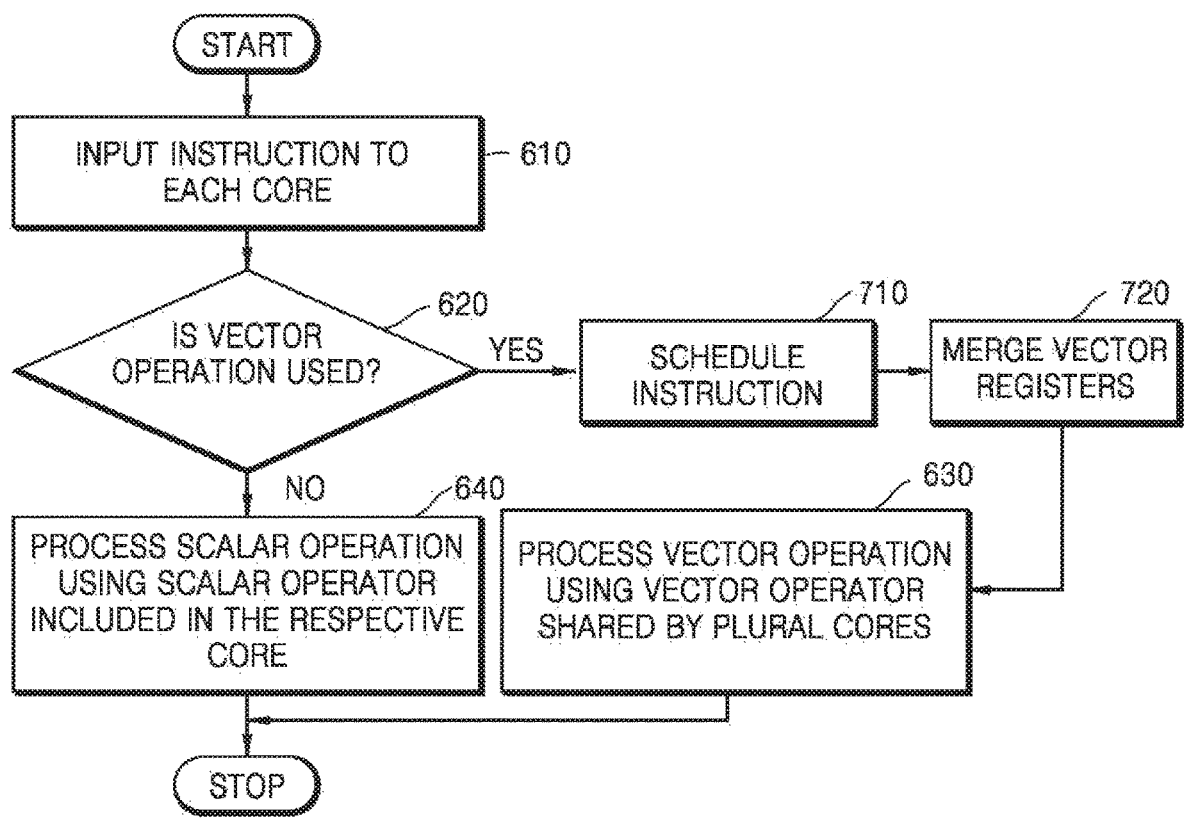
FIG. 7 is a flowchart illustrating an operation processing method according to another exemplary embodiment.

The methods of processing instructions by using a plurality of cores in the operation processing apparatus 100 according to exemplary embodiments will now be described below with reference to FIGS. 6 and 7. FIGS. 6 and 7 illustrate instruction processing methods performed in the operation processing apparatus 100 shown in FIGS. 2-5. Thus, it should be noted that the descriptions provided above with reference to FIGS. 2-5 regarding the operation processing apparatus 100 are applicable to the instruction processing methods of FIGS. 6 and 7 as well, even though some of the descriptions may be omitted below.

FIG. 6 is a flowchart illustrating an exemplary embodiment of the operation processing method.

In operation 610, each of the plurality of cores in the operation processing apparatus 100 may receive an instruction. Each instruction may be fetched from a memory and input to a corresponding one of the plurality of cores.

In operation 620, each core in the operation processing apparatus 100 may determine whether the received instruction uses a vector operation. For the determination, the operation processing apparatus 100 may decode each of the instructions. If it is determined in the operation 620 that the vector operation is used (operation 620, YES), the operation processing method proceeds to operation 630. If, however, it is determined in the operation 620 that the vector operation is not used (operation 620, NO), the operation processing method proceeds to operation 640.

In the operation 630, the operation processing apparatus 100 may process the vector operation using the vector operator shared by the plurality of cores. For example, the operation processing apparatus 100 may transfer the received instruction to a vector operator shared by the plurality of cores so that the vector operation is performed with respect to the transferred instruction. If the number of cores is less than that of vector operators, the cores may share the vector operators. For example, four cores may share a single vector operator. Alternatively, two of the four cores may share one of two vector operators.

In the operation 630, the operation processing apparatus 100 may process vector operations with respect to the instructions transferred from the cores sequentially in accordance with the pipelining stages of the vector operator. Accordingly, the vector operator of the operation processing apparatus 100 may process the instructions transferred from the plurality of cores, with each instruction being in a stage different from the other instructions. The number of stages in the pipelining may be modified depending on the processor architecture, and the present inventive concept is not limited to a particular number of stages.

In the operation 630, the operation processing apparatus 100 may read the data used for the vector operation from the vector register shared by the plurality of cores. Since the data used for the vector operation is read from a vector register used in common by the cores, the vector register may be overwritten by other data as the pipelining stages proceed. Alternatively, however, the operation processing apparatus 100 may read the data used for the vector operation from separate registers independently residing in respective cores. If the cores are equipped with respective vector registers, data overwriting does not occur in the vector register and the stability of data stored in the vector registers is enhanced even though the vector operator processes a plurality of instructions on a pipelining basis.

In the operation 640, the operation processing apparatus 100 may process the scalar operation using the scalar operator included in the respective core. For example, the operation processing apparatus 100 may transfer the instruction received by a core to a scalar operator in the core so that a scalar operation may be performed.

FIG. 7 is a flowchart illustrating another exemplary embodiment of the operation processing method.

Since the operations 610, 620, 630, and 640 were described above with reference to FIG. 6, descriptions thereof will not be repeated.

In FIG. 7, if it is determined in the operation 620 that the vector operation is used (operation 620, YES), the operation processing method proceeds to operation 710. In operation 710, the operation processing apparatus 100 may schedule the instruction. For example, the operation processing apparatus 100 may select one or more cores from among a plurality of cores and deliver instructions received by the selected one or more cores to a vector operator. The operation processing apparatus 100 may alternatively or additionally determine processing priorities of the instructions to be executed by the vector operator.

In operation 720, the operation processing apparatus 100 may merge a plurality of vector registers. For example, since instructions of the cores not selected in the operation 710 are not processed by the vector operator, vector registers in the unselected cores are not used. Hence, the one or more cores selected in the operation 710 may merge with the vector register in one or more of the unselected cores.

In the operation 720, the operation processing apparatus 100 may increase the size of the vector register without physically merging a plurality of vector registers by changing bit allocations of the operand of the instruction. As described above, the operation processing apparatus 100 may arbitrarily change the size of the vector register by reducing a bit length of high-order bits of the instruction operand that specify one of the plurality of cores and resultantly adjusting the length of remaining bits that represent a relative address in the merged vector register.

The operation processing method may be implemented as computer-readable code in a non-transitory computer-readable storage medium. The non-transitory computer-readable storage medium may be any kind of recording device which stores computer-readable data. Examples of the non-transitory computer-readable storage medium include ROMs, RAMs, CD-ROMs, magnetic tapes, floppy disks, hard disks, optical recording media, and transmission media such as Internet transmission media. The non-transitory computer-readable storage medium may also be a distributed network, and the computer-readable code may be stored and executed in a distributed fashion.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An operation processing apparatus comprising:
    a vector core configured to process a vector operation with respect to an instruction that uses the vector operation;
    a plurality of cores, each core of the plurality of cores comprising a scalar operator configured to process a scalar operation with respect to an instruction that does not use the vector operation, and a vector register configured to store data used by the vector operation;
    a scheduler configured to select one or more cores from among the plurality of cores, determine processing priorities of instructions to be processed by the vector core, and deliver an instruction to be processed by the selected one or more cores to the vector core, based on the determined processing priorities; and
    a register merger configured to merge a vector register in the selected one or more cores with a vector register in one or more unselected cores,
    wherein the vector core is shared by the plurality of cores, the vector core comprises a plurality of pipelining stages and receives an instruction from one of the plurality of cores on each pipelining stage proceeding clock, and
    the vector core is configured to process the instructions transferred from the plurality of cores in accordance with the plurality of pipelining stages,
    wherein a first unselected core and a second unselected core receive and process scalar operations, while a first vector register of the first unselected core and a second vector register of the second unselected core are merged with vector registers of the selected one or more cores, and
    wherein a first portion of bits of the instruction indicate a core identifier of one of the plurality of cores to process the instruction, and a second portion of the bits of the instruction define a relative address in the vector register.

2. The operation processing apparatus of claim 1, wherein the vector core is configured to process the instructions transferred from the plurality of cores sequentially in accordance with the plurality of pipelining stages.

3. The operation processing apparatus of claim 1, wherein the vector register is shared by the plurality of cores.

4. The operation processing apparatus of claim 1, wherein the register merger is configured to reduce a bit length of high-order bits that specify one of the plurality of cores in an operand input to the selected one or more cores, in which remaining bits represent a relative address in a merged vector register.

5. An operation processing method performed by a processor comprising a plurality of cores, the method comprising:
    receiving an instruction in each core of the plurality of cores;
    when the received instruction uses a vector operation, transferring the received instruction to a vector core of the processor and processing the vector operation with respect to the received instruction; and
    when the received instruction does not use the vector operation, transferring the received instruction to a scalar operator of the processor and processing a scalar operation with respect to the received instruction,
    selecting one or more cores among the plurality of cores to transfer an instruction to be processed by the selected one or more cores to the vector core,
    determining processing priorities of instructions being executed by the vector core, and
    merging a vector register in the selected one or more cores with a vector register in one or more unselected cores,
    wherein the vector core is shared by the plurality of cores, the vector core comprises a plurality of pipelining stages, each pipelining stage receiving an instruction from one of the plurality of cores, and the scalar operator is independently included in each core of the plurality of cores and the vector core is configured to process the instructions transferred from the plurality of cores in accordance with the plurality of pipelining stages,
        wherein a first unselected core and a second unselected core receive and process scalar operations, while a first vector register of the first unselected core and a second vector register of the second unselected core are merged with vector registers of the selected one or more cores, and
    wherein a first portion of bits of the instruction indicate a core identifier of one of the plurality of cores to process the instruction, and a second portion of the bits of the instruction define a relative address in the vector register.

6. The method of claim 5, wherein, in the processing of the vector operation, the instructions transferred from the plurality of cores are processed sequentially in accordance with the plurality of pipelining stages.

7. The method of claim 5, wherein the processing of the vector operation comprises reading data used by the vector operation from a vector register shared by the plurality of cores.

8. The method of claim 5, wherein the processing of the vector operation comprises reading data used by the vector operation from a vector register included independently in each core of the plurality of cores.

9. The method of claim 5, wherein the merging comprises reducing a bit length of high-order bits that specify one of the plurality of cores in an operand input to the selected one or more cores, in which remaining bits represent a relative address in a merged vector register.

10. A non-transitory computer-readable storage medium having stored therein program instructions which, when executed by a computer, perform the method comprising:
    receiving an instruction in each core of a plurality of cores;
    when the received instruction uses a vector operation, transferring the received instruction to a vector core of a processor and processing the vector operation with respect to the received instruction; and when the received instruction does not use the vector operation, transferring the received instruction to a scalar operator of the processor and processing a scalar operation with respect to the received instruction, selecting one or more cores among the plurality of cores to transfer an instruction to be processed by the selected one or more cores to the vector core, determining processing priorities of instructions being executed by the vector core, and merging a vector register in the selected one or more cores with a vector register in one or more unselected cores, wherein the vector core is shared by the plurality of cores, the vector core comprises a plurality of pipelining stages, each pipelining stage receiving an instruction from one of the plurality of cores, and the vector core is configured to process the instructions transferred from the plurality of cores in accordance with the plurality of pipelining stages, wherein a first unselected core and a second unselected core receive and process scalar operations, while a first vector register of the first unselected core and a second vector register of the second unselected core are merged with vector registers of the selected one or more cores, and wherein a first portion of bits of the instruction indicate a core identifier of one of the plurality of cores to process the instruction, and a second portion of the bits of the instruction define a relative address in the vector register.

11. An operation processing apparatus comprising:

a plurality of scalar cores, each scalar core of the plurality of scalar cores comprising a scalar operator configured to process a scalar operation and a vector register configured to store data used by a vector operation;

a vector core that is shared by the plurality of scalar cores and is configured to process the vector operation, the vector core comprising a plurality of pipelining stages and receiving an instruction from one of the plurality of scalar cores on each pipelining stage proceeding clock; and a scheduler that is configured to select one or more scalar cores from among the plurality of scalar cores, determine processing priorities of instructions to be processed by the vector core, and deliver an instruction that uses vector processing from the selected one or more scalar cores to the corresponding pipelining stage of the vector core for processing based on the determined processing priorities; and a register merger configured to merge a vector register in the selected one or more scalar cores with a vector register in one or more unselected scalar cores, wherein the vector core is configured to process the instructions transferred from the selected one or more scalar cores in accordance with the plurality of pipelining stages, and wherein a first unselected scalar core and a second unselected scalar core receive and process scalar operations, while a first vector register of the first unselected scalar core and a second vector register of the second unselected scalar core are merged with vector registers of the selected one or more scalar cores, and wherein a first portion of bits of the instruction indicate a core identifier of one of the plurality of scalar cores to process the instruction, and a second portion of the bits of the instruction define a relative address in the vector register.

* * * * *